(12) United States Patent
Pérez Barbáchano et al.

(10) Patent No.: US 9,222,459 B2
(45) Date of Patent: Dec. 29, 2015

(54) HYDROGEN PRODUCTION SYSTEM FOR CONTROLLING THE POWER OUTPUT OF POWER STATIONS BASED ON RENEWABLE ENERGY SOURCES AND CONTROL PROCESS

(75) Inventors: Javier Pérez Barbáchano, Sarriguren (ES); Eugenio Guelbenzu Michelena, Sarriguren (ES); Pablo Sanchis Gúrpide, Pamplona (ES); Alfredo Ursúa Rubio, Pamplona (ES); Luis Marroyo Palomo, Pamplona (ES); Israel Sánchez Mayayo, Pamplona (ES)

(73) Assignees: INGETEAM POWER TECHNOLOGY, S.A., Zamudio, Bizkaia (ES); ACCIONA ENERGIA, S.A., Sarriguren (Navarra) (ES)

( * ) Notice: Subject to any disclaimer, the term of this patent is extended or adjusted under 35 U.S.C. 154(b) by 146 days.

(21) Appl. No.: 13/640,674

(22) PCT Filed: Apr. 28, 2010

(86) PCT No.: PCT/ES2010/070272
§ 371 (c)(1),
(2), (4) Date: Dec. 21, 2012

(87) PCT Pub. No.: WO2011/135110
PCT Pub. Date: Nov. 3, 2011

(65) Prior Publication Data
US 2013/0093194 A1    Apr. 18, 2013

(51) Int. Cl.
*C25B 1/02* (2006.01)
*C25B 15/02* (2006.01)
(Continued)

(52) U.S. Cl.
CPC . *F03B 17/00* (2013.01); *C25B 1/02* (2013.01); *C25B 15/02* (2013.01); *F03D 9/00* (2013.01);
(Continued)

(58) Field of Classification Search
CPC .................................. C25B 15/02; G05F 5/00
USPC ......... 204/229.4, 230.2, 228.1; 205/637, 628, 205/335, 337
See application file for complete search history.

(56) References Cited

U.S. PATENT DOCUMENTS 5,592,028 A    1/1997    Pritchard
(Continued)

FOREIGN PATENT DOCUMENTS

| DE | 10055973 A1 | 5/2002 |
|---|---|---|
| EP | 1596052 A1 | 11/2005 |

(Continued)

OTHER PUBLICATIONS

Mantz, et al., Hydrogen Production from Idle Generation Capacity of Wind Tubrines, International Journal of Hydrogen Energy, Elsevier Science Publishers B.V., Barking GB, Aug. 1, 2008, 33:16:4291-4300.
(Continued)

*Primary Examiner* — Nicholas A Smith
*Assistant Examiner* — Brian W Cohen
(74) *Attorney, Agent, or Firm* — Blank Rome LLP (57) ABSTRACT

It stands out mainly for consisting of a nested configuration of electrolysis units (5), independently operated, the nominal power values of which are descendant in such a manner that, for any unit of the system, the sum of the nominal power of the smaller electrolysis units (5) is always greater than or equal to the "dead band" (DB) of said units, allowing reduction of the dead band of said hydrogen production system (4) to negligible levels, avoiding loss or discharge of the energy generated in said renewable power stations, preferably one or several wind farms (2) formed by a group of wind turbines (1), connected to the power grid (3) as a consequence of the implementation of a primary control service therein or, in general, of any other active power control service, thereby optimizing the total energy obtained.

23 Claims, 9 Drawing Sheets

(51) Int. Cl.
*F03B 17/00* (2006.01)
*F03D 9/00* (2006.01)
*H02J 3/28* (2006.01)
*H02J 15/00* (2006.01)
*G05F 5/00* (2006.01)
*F03D 9/02* (2006.01)
*H02J 3/38* (2006.01)

(52) U.S. Cl.
CPC .. *F03D 9/02* (2013.01); *G05F 5/00* (2013.01); *H02J 3/28* (2013.01); *H02J 3/386* (2013.01); *H02J 15/00* (2013.01); *F05B 2220/61* (2013.01); *Y02E 10/72* (2013.01); *Y02E 10/763* (2013.01); *Y02E 10/766* (2013.01); *Y02E 70/10* (2013.01); *Y02E 70/30* (2013.01)

(56) References Cited

U.S. PATENT DOCUMENTS

| | | | |
|---|---|---|---|
| 8,500,969 B2 * | 8/2013 | Guelbenzu Michelena et al. | 204/230.2 |
| 2006/0125241 A1 | 6/2006 | DuHamel | |
| 2007/0216165 A1 | 9/2007 | Oohara et al. | |
| 2008/0127646 A1 * | 6/2008 | Doland | 60/641.2 |
| 2009/0134041 A1 * | 5/2009 | Mishra et al. | 205/628 |
| 2010/0114395 A1 * | 5/2010 | Hinatsu et al. | 700/295 |

FOREIGN PATENT DOCUMENTS

| | | |
|---|---|---|
| EP | 1975279 A1 | 10/2008 |
| WO | WO-2006097494 A1 | 9/2006 |
| WO | WO 2009050311 A1 * | 4/2009 |
| WO | WO-2010018240 A1 | 2/2010 |

OTHER PUBLICATIONS

Valenciaga, et al., Control Design for an Automous Wind Based Hyrdogen Production System, International Journal of Hydrogen Energy Elsevier Science Publishers B.V., Barking GB, Mar. 24, 2010: 35:11:5799-5807.

International Search Report issued in PCT/ES2012/070272 on Nov. 11, 2010.

* cited by examiner

HYDROGEN PRODUCTION SYSTEM FOR CONTROLLING THE POWER OUTPUT OF POWER STATIONS BASED ON RENEWABLE ENERGY SOURCES AND CONTROL PROCESS

This application is the U.S. national phase of International Patent Application No. PCT/ES2010/070272, filed Apr. 28, 2010.

DESCRIPTION

Object of the Invention

The present invention belongs to the field of renewable energy sources and, more specifically, to hydrogen production systems for controlling the power of power stations.

The main object of the present invention is a hydrogen production system connected to one or several power stations based on non-manageable renewable resources, such as wind farms and photovoltaic power stations, aimed at improving the power output control services to avoid energy losses and optimize the size of a hydrogen production system. Likewise, another object of the invention is a process for controlling power delivered/injected to the power grid.

BACKGROUND OF THE INVENTION

Wind-powered electric power generation systems are aimed at converting kinetic wind energy into electrical energy and, in the case of grid-connected wind-powered systems, loading it therein for subsequent transport, distribution and use thereof.

In power grids with low penetration levels of wind-powered systems, the control systems that the operators of said grids apply to the rest of the generation units (conventional power stations) are generally sufficient to compensate fluctuations in the electric power injected by wind farms into the grid. These fluctuations are obviously produced by the variations inherent to wind resources. However, as the penetration of wind-powered systems in the grid increases, grid operators require said systems to participate in grid control operations, as in the case of conventional power stations.

The foregoing is equally valid for any renewable generation system that depends on a non-manageable resource, as in the case of photovoltaic systems and solar resources. Although we primarily make reference to wind-powered systems in the text of the invention, it must be understood at all times that it can be extended to renewable generation systems with non-manageable energy resources.

Maintenance of the balance between active, generated and consumed power in current power grids is carried out by maintaining system frequency at its nominal value (50 Hz in Europe, 60 Hz in the United States). When the power generated in the system exceeds that consumed, the system frequency rises with respect to its nominal value on accelerating the mechanical axles of the synchronous alternators in stations. On the contrary, when the power generated is less than that consumed, the frequency drops as the synchronous alternator axles slow down, reducing their speed. In order to compensate these deviations in frequency, in addition to those corresponding to active power, conventional stations are equipped with power controllers that respond to variations in frequency value in accordance with different system frequency control processes, such as primary, secondary and tertiary control.

Primary control allows restoration of the balance between active power generated and consumed by the grid. The combined operation of all the electricity generation units in an interconnected grid allows fast compensation of phase differences between consumed and generated power at any point of the grid. In most power grids, the legislation obliges conventional stations to establish a specific primary control capacity. This control consists of incorporating a control mechanism for proportionally increasing or reducing the power output reference value of the station and, in the opposite direction, to the variation in grid frequency, based on a characteristic referred to as statism. This characteristic is a straight line that descends on a coordinate plane where the horizontal axis is determined by the frequency variation with respect to its nominal value, as a percentage of this value, and the vertical axis by the variation in power with which the power station must respond at a given time to the corresponding frequency variations, said variation in power also being expressed as a percentage of the nominal power of the station. In this manner, statism is determined when the operator establishes the maximum frequency variation value to which stations must react, in addition to the maximum variation in power with which they must respond, with respect to the nominal power at a given time. Primary control must occur in small response times, in the order of seconds.

Secondary control allows restoration of power grid frequency to its nominal value. By means of said control, which is usually optional and remunerated, the system operator assigns new power generation values to the power stations, within control bands previously negotiated by the electricity companies that own the power stations. In this manner, power stations modify their power reference value until system frequency returns to its nominal value under the stationary regime. As opposed to primary control, secondary control occurs in response times in the order of minutes.

Finally, tertiary control, also remunerated, provides the power grid operator with more or less electricity generation capacity for the purpose of addressing possible deviations between predicted power consumption and expected electricity generation. In practice, tertiary control represents a change in the station programmed power set point, in such a manner that their operating horizon reaches values of nearly one or several hours.

At present, the constant increase in wind-powered electricity generation and that generated by other renewable sources with non-manageable resources, represents a significant challenge in power grid operation, the action protocols of which have developed over the years for a system based on manageable conventional energy sources. While assuming the inevitable variability of electricity consumption, statistical methods are currently capable of correctly predicting demand on a daily and hourly basis to a high degree. In this manner, operating protocols have allowed effective management of demand variability margin by conventional stations through the different control and operating services.

At present, the massive incorporation of renewable generation stations based on non-manageable resources (mainly wind farms) into power demand coverage brings additional uncertainty to grid operation, such as the unpredictable variability of said resources.

By way of example, we must point out the fact that in Spain, according to information provided by the company in charge of Spanish power grid operation, Red Eléctrica de España, in the early hours of the 30 of Dec. 2009, wind farm generation accounted for 54.1% of total generation, i.e. more than half of the electricity demand was covered by a non-manageable renewable resource. This degree of coverage represented a milestone in wind energy penetration and was successfully supported by grid operation thanks to the participation therein by the pumping stations and the reduction in the production of the thermal power stations to a technical minimum. Despite this, the low demand at the time obliged the operator to issue an order to cut back wind power generation by 600 MW for several hours. In similar situations produced in previous months, larger cutbacks were ordered, particularly in those cases where there was insufficient hydraulic pumping capacity.

The preceding example illustrates the fact that current operating protocols, even with the new grid operation-related technology (creation of renewable energy control centers, establishment of connections and communication with the generation control centers, installation of technical requirements for connection and communication, etc.), are reaching their limit in the integration of renewable energy sources, which will require power control services even in the case of electricity generation stations based on non-manageable renewable energy sources, including wind farms, in order to ensure grid stability as more renewable energy stations are incorporated thereto.

With regard to the primary control service and taking a wind farm as a representative example of a renewable energy station, different techniques have been proposed to provide this service using only the farm's wind turbines. In order for the wind turbines of a wind farm to provide the primary control service, they must operate at a maximum power value equal to the difference between the maximum wind power at a given time and the maximum power variation established by legislation for primary control (1.5% of the nominal power in Spain). This guarantees that, in the event that grid frequency drops to the minimum value established by the legislation and/or the operator's operating protocols, the wind turbine will have the necessary power capacity to raise it to the aforementioned maximum variation in power. The technical problem that this entails is that this process implies a constant loss (referred to as "discharge") of wind energy, as the wind turbine operates under permanent regime almost always below the maximum extractable power in order to ensure that the power output variation margin fulfils the primary control.

There are patent documents that disclose hydrogen production systems powered by wind energy, as in the case of patents: WO2006097494, EP1596052, US20070216165, US20060125241 and DE10055973.

With regard to hydrogen production, there are basically two types of water electrolysis technologies: alkaline and polymeric membrane (PEM). The former are technologically developed and achieve very superior power values. An electrolyzer decomposes a water molecule to generate hydrogen and oxygen by applying electrical energy. The thermodynamic analysis of the system indicates the existence of a minimum supply of energy for this electrochemical reaction to take place in a sustained manner over time. In turn, the generation of hydrogen and oxygen in the electrolysis units must occur separately and be channeled inwards, avoiding the potentially explosive mixture of the two gases. At low production values, gas generation slows down, thereby increasing the risk of explosive mixtures. On the other hand, the purity of the gases produced depends, among other factors, on the operating point of the electrolysis system, worsening when said operating point is low.

In turn, current electrolyzers can be formed by one or several electrolysis units. In the event of including several units, operation thereof is always carried out jointly.

Due to the foregoing, current electrolyzers, whether formed by one or several electrolysis units, have a lower limit in their operating range below which the manufacturer does not allow operation thereof. This limit guarantees both safe operation of the electrolysis system and maintenance of the purity of the gas produced. Although the limit varies depending on the manufacturers, a representative range of current alkaline technologies could establish the limit at between 15% and 40% of the nominal power of the electrolysis system. This region within which the electrolysis system cannot operate represents a "dead band" (DB) for the system.

In order for the primary control service of a wind farm to be jointly carried out by the wind turbines and an electrolysis system, the size of the latter will be determined both by the primary control band imposed by the grid operator and its acceptable operating range, i.e. the power range above the lower operating limit of the electrolysis system or dead band. This requires considerable oversizing of the hydrogen system for the purpose of fulfilling the primary control service and avoiding wind energy losses, with the high economic cost that said oversizing entails. This is equally valid for any other type of control service that implies variations in the power injected into the grid.

DESCRIPTION OF THE INVENTION

The present invention resolves the aforementioned drawbacks by providing a hydrogen production system connected to one or several power stations based on non-manageable renewable resources, such as wind farms, wherethrough it is possible to control the power delivered to the power grid in order to maintain grid frequency at its nominal value, preferably being primary control services, avoiding energy losses in said power stations and optimizing performance thereof.

Said hydrogen production system stands out basically for consisting of a nested configuration of electrolysis units, independently operated, the main characteristic of which is that the value of the dead band "DB" of the system is considerably lower than that of current hydrogen production systems.

This nested configuration allows optimization of the operating range of the hydrogen production system and avoids having to oversize said system in order to fulfill the power output requirements established by law in each country. To this end, the electrolysis units that configure the system have nominal power values that are calculated in accordance with a specific algorithm, allowing minimization of the overall size of the hydrogen production system by adapting it to control service requirements and achieving a significant reduction in the size of the system compared to existing alternatives.

In the hydrogen production system proposed, each of its constituent electrolysis units is independently controlled. Through the controlled and independent adjustment of each unit it is possible to operate in such a manner that the resulting dead band for the production system is identical to the dead band of the electrolysis unit of smaller size, practically negligible on applying the aforementioned algorithm and continuous throughout the operating range of the system, i.e. from the nominal power of the system to its lower limit, close to zero, corresponding to the aforementioned dead band.

Both the wind farm and the hydrogen production system incorporate power electronics and control and supervision systems. In the case of a wind farm, power electronics are mainly applied to wind turbines, while control and supervision is carried out in a co-ordinated manner between these and the farm itself. In the case of electrolysis units, these are also equipped with power electronics and control systems. Said control and supervision systems may have multiple embodiments, preferably being a programmable automaton-type industrial system with a microcontroller and user interface, actuated either manually or remotely.

Additionally, a global supervision system allows constant calculation of the operating point in both wind turbines and electrolysis units.

Next, the description of the invention focuses on the primary control service, although it is equally valid for providing other control services, such as secondary and tertiary, in addition to helping to control reactive power at the point of connection to the power station within the apparent power margin not used by the active power output control.

The hydrogen production system, independently or in co-ordination with the farm or aggregated wind farms, adapts its production to control the power injected into the renewable electricity generation system at the grid connection point, in such a manner that it allows the farm to fulfill the primary control requirements thereof, among others.

Below we make reference to the concept of nested configuration to clarify this term. Assuming that the hydrogen production system is initially composed of a single electrolysis unit, called $E_1$ (initial electrolysis unit). Now, $E_1$ is divided into two units of different size, the larger unit called $E_{2l}$ (subscript l, "large") and the smaller unit $E_{2s}$ (subscript s, "small"). If the smaller unit is chosen with a nominal power identical to the dead band of the larger unit, the result is a hydrogen production system without discontinuity throughout the operating range and with a lower resulting dead band (DB) than in the case of $E_1$. Therefore, it is an optimal power distribution that depends on the value of the dead band of the technology used.

At this point, the electrolysis unit with less power ($E_{ns}$, in general) can in turn be divided into two units with the same power distribution and ensuring that $E_{ns}$ is always equal or greater than the dead band $E_{nl}$, or, in other words, that $E_{ns}$ is always equal to or greater than the product of the dead band, as a percentage, of the technology selected times the nominal power of $E_{nl}$. The final system is formed by n electrolysis units, namely, the units of larger size of the successive divisions (from $E_{2l}$ to $E_{nl}$) and the smallest unit of the last division ($E_{ns}$).

The electrolysis units nominal powers must fulfill the following equations:

$$\left.\begin{array}{c} \min E_{ns} \\ E_{2s} + E_{2l} = E_1 \\ DB \cdot E_{2l} \le E_{2s} \end{array}\right\} \quad \begin{array}{c} E_{2l} = \dfrac{E_1}{1+DB} \\ E_{2s} = \dfrac{DB}{1+DB} E_1 \end{array} \quad \ldots \quad \begin{array}{c} E_{nl} = \dfrac{E_1}{(1+DB)^{n-1}} \\ E_{ns} = \dfrac{(DB)^{n-1}}{(1+DB)^{n-1}} E_1 \end{array}$$

The result of the whole process is the reduction of the dead band of the system ($DB_n$) through the minimization of the size of the electrolysis units. With this power distribution strategy, the size of the dead band of the system ($DB_n$), based on the number of divisions n and the limit imposed by the selected electrolysis technology (DB), is calculated in the following manner:

$$\left.\begin{array}{c} DB \cdot E_{2s} = DB_2 \cdot E_1 \\ DB \cdot E_{3s} = DB_3 \cdot E_1 \end{array}\right\} DB_n = \dfrac{DB \cdot E_{ns}}{E_1} = \dfrac{(DB)^n}{(1+DB)^{n-1}}$$

Said electrolysis units may be different electrolyzers, of the same or different technology, or stacks of a single electrolyzer. The electrolysis units, independently controlled, are disposed in a nested configuration in such a manner that the operating range of the subsystem is maximized, achieving the smallest possible size and cost. Likewise, the renewable electricity production system may consist of an aggregation of wind farms, connected to the same or different point of the power grid but managed in co-ordination with the hydrogen production system that is the object of the present invention, which may also be connected to the power grid at a different point of connection than the wind farm or aggregation of wind farms.

It has been envisaged that the hydrogen production system that is the object of the invention will be backed up by battery racks or any other storage system that will be in charge of controlling power output in specific grid frequency range bands.

It may also be backed up by fuel cells, hydrogen combustion engines connected to rotating electric generators or any other equivalent system. Additionally, the possibility of incorporating a hydrogen storage system is envisaged, in such a manner that the hydrogen produced by the hydrogen production system is subsequently consumed by any of these systems.

Likewise, the hydrogen production system of the present invention may comprise an energy storage system based on flywheels or condenser banks or a combination of these with the battery system.

The system disclosed herein is applicable to all types of wind farms connected to the grid, in addition to aggregations of wind farms with co-ordinated management, photovoltaic power stations or groups of these and, in general, for any renewable electricity generation system at the same or different point of connection to the grid and managed in a co-ordinated manner. Likewise, the nested configuration of electrolysis units disclosed herein may be applied to any hydrogen production system, whether or not it is interconnected to an electricity generation system.

DESCRIPTION OF THE DRAWINGS

In order to complement this description and with the object of helping to better understand the characteristics of the invention, according to a preferred example of practical embodiment thereof, a set of drawings has been included as an integral part of said description, wherein the following have been represented in an illustrative and non-limiting manner.

PREFERRED EMBODIMENT OF THE INVENTION

Figure 1:
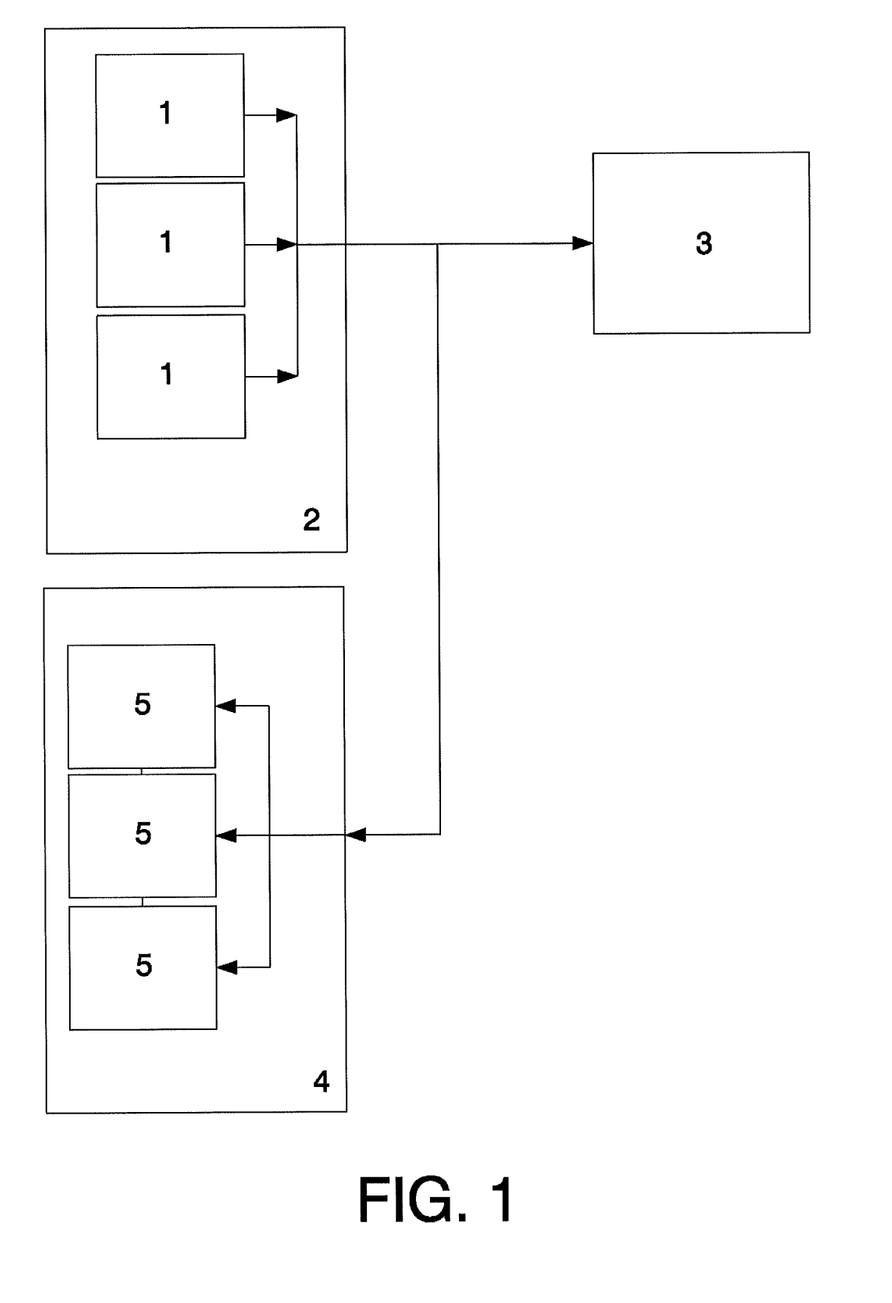
FIG. 1 shows a schematic view of the hydrogen production system for controlling the power output of a grid-connected wind farm.

In accordance with a preferred embodiment of the invention shown in FIG. 1, the hydrogen production system (4) is associated with a wind farm (2) connected to the power grid (3), said wind farm (2) being formed by a group of wind turbines (1), while the hydrogen production system (4) has a nested structure of three electrolysis units (5), in such a manner that its nominal power values will allow maximisation of the operating range required to jointly provide the primary control services. Said primary control service may be provided by the hydrogen production system (4) or jointly between the wind farm (2) and said hydrogen production system (4).

Both the wind farm (2) and the hydrogen production system (4) incorporate power electronics and control and supervision systems. In the case of the wind farm (2), the power electronics and their associated control are installed in the wind turbines (1). In the case of the electrolysis units (5), these are also equipped with power electronics and control for the purpose of being managed independently. Additionally, a global supervision system allows constant calculation of the operating point of both the wind turbines (1) and electrolysis units (5).

Every wind turbine (1) has a maximum power value ($P_{Wmax}$) that said wind turbine (1) can extract from the wind and convert into electrical energy. The power electronics, supervision and control system and the electromechanical systems installed in wind turbines (1) allow this operating point value.

Figure 2:
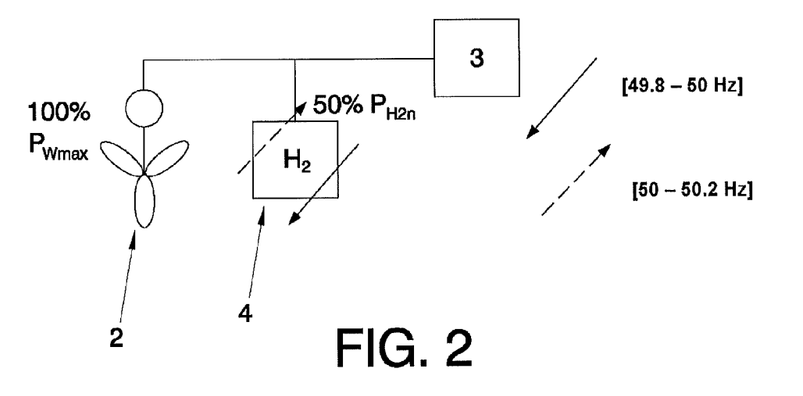
FIG. 2 shows a schematic view wherein the primary control service provided only by the hydrogen production system is represented.

In accordance with a first preferred embodiment, shown in FIG. 2, primary control is provided only by the hydrogen production system (4), with control bands, by way of example, ranging between 49.8 Hz and 50.2 Hz, proximate to a nominal frequency of 50 Hz. The wind turbines (1) of the wind farm (2) continue operating at the maximum power available at a given time ($P_{Wmax}$), governed by the farm's control systems, shown in FIG. 2 as "100% $P_{Wmax}$" for the wind farm (2).

With regard to the hydrogen production system (4), its operating range is equal to the sum of the primary control bands for injection and withdrawal, established by the power grid (3) operator and known beforehand. While the primary control service is not required, the hydrogen production system (4) operates at 50% of its operating range, i.e. from the lower limit of operation, determined by its dead band, to its nominal power (maximum possible power for the system). In this situation, the power injected into the grid (3) is the difference between the maximum electrical power generated by the wind turbines (1) ($P_{Wmax}$) and the power consumed by the hydrogen production system (4) which, as mentioned earlier, is 50% of its available power range.

When primary control is required, i.e. power must be injected into the grid (3), which occurs when the frequency drops below its reference value, the hydrogen production system (4) reduces its power consumption, a situation represented in FIG. 2 by the downward-pointing arrow. On the contrary, when the power delivered to the grid (3) must be reduced, the hydrogen production system (4) increases its power consumption, a situation represented in FIG. 2 by the upwardpointing arrow.

Figure 3:
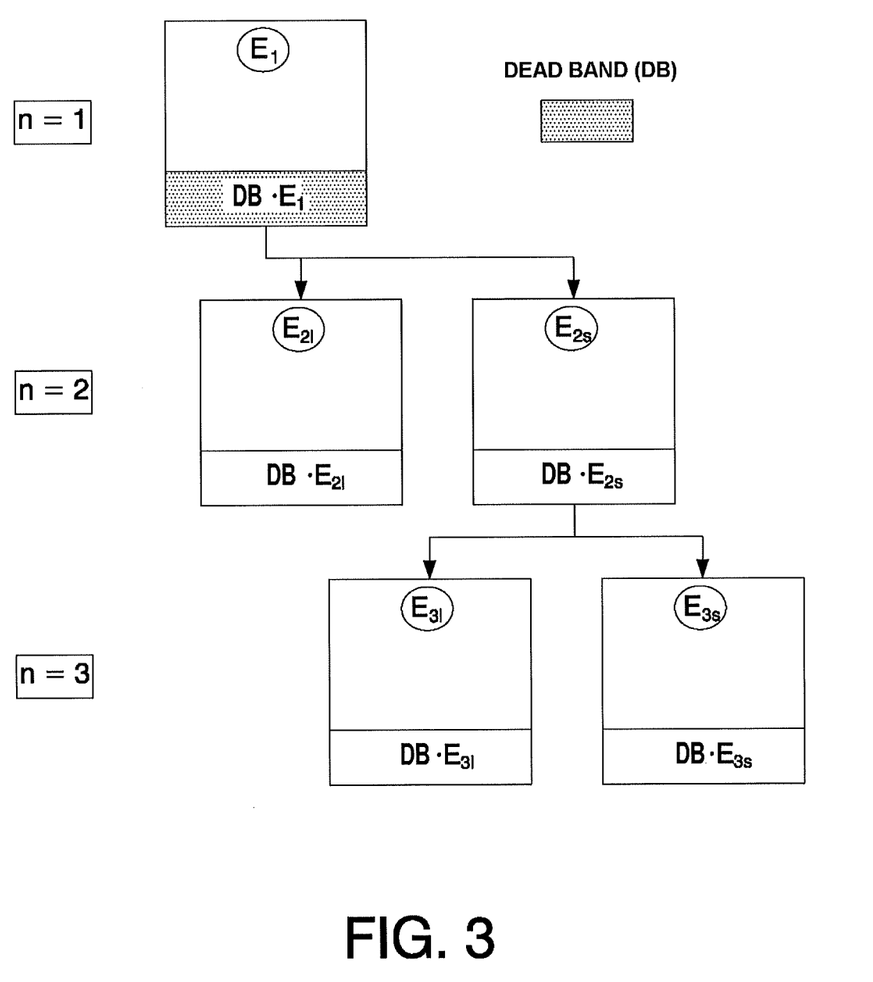
FIG. 3 shows a schematic view of the division of a hydrogen production system into three electrolysis units.
Figure 4:
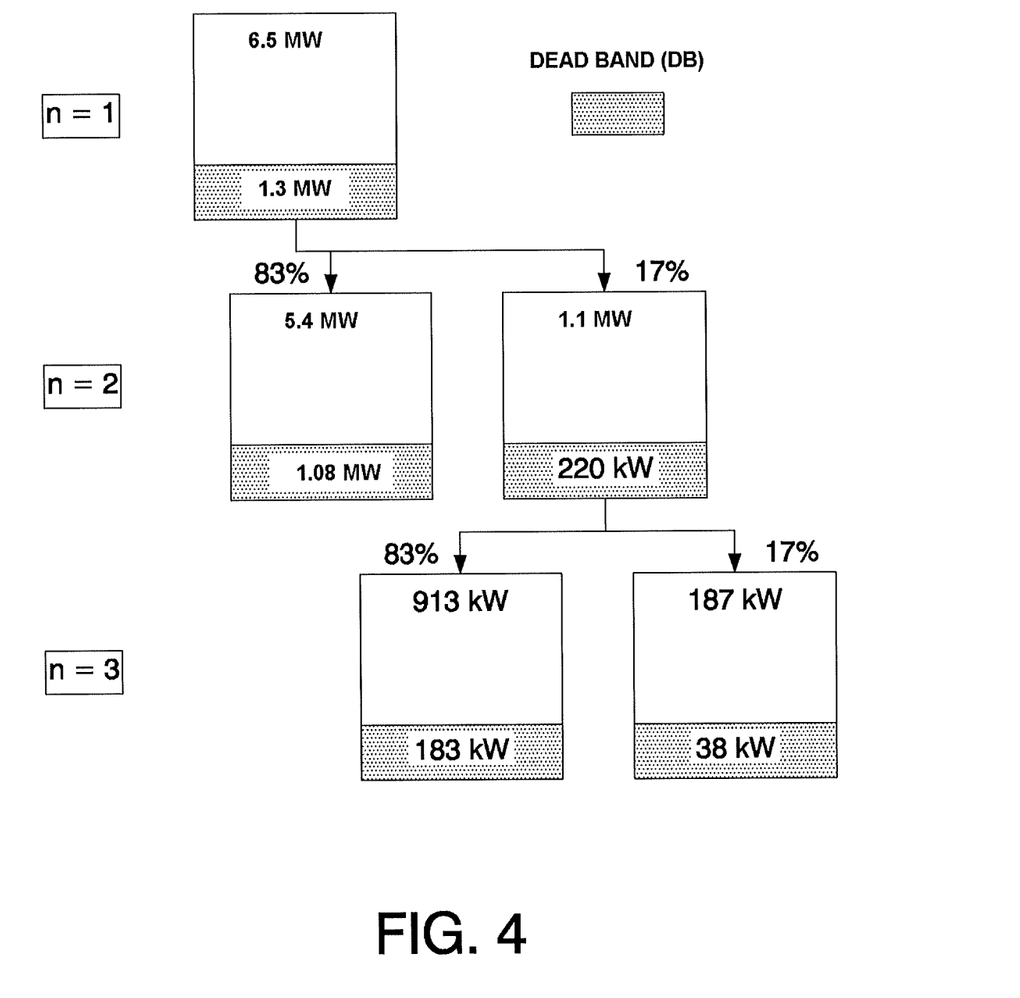
FIG. 4 shows a division into three electrolysis units of a hydrogen production system with a total nominal power of 6.5 MW.

FIG. 3 shows the division of an electrolysis unit ($E_1$) into three units ($E_{2l}$, $E_{3l}$ and $E_{3s}$). More specifically, FIG. 4 shows an example with real values based on a hydrogen production system (4) with a total nominal power ($P_{H2n}$) of 6.5 MW and electrolysis technology with a dead band of 20% with respect to its nominal power. By applying the proposed invention with n=3, the electrolysis system of nominal power $P_{H2n}$ would be divided in this case into three units $E_{2l}$, $E_{3l}$ y $E_{3s}$, with nominal powers of 5.4 MW, 913 KW and 187 KW.

$$E_{2l} = \frac{E_1}{1+DB} = \frac{E_1}{1+0,2} \approx 0,83 \cdot E_1$$

$$E_{2s} = \frac{DB}{1+DB}E_1 = \frac{0,2 \cdot E_1}{1+0,2} \approx 0,17 \cdot E_1$$

$$E_{2l} = 0,83 \cdot 6,5 \text{ MW} = 5,4 \text{ MW}$$

$$E_{2s} = 0,17 \cdot 6,5 \text{ MW} = 1,1 \text{ MW}$$

Therefore, with a division into only three units (n=3), DB is reduced from 20% to the 0.58% of $P_{H2n}$. This calculation is shown in the following equation, where $DB_n$ indicates the final DB of the hydrogen production system, having made n divisions (in the example n=3).

$$DB_n = \frac{DB \cdot E_{ns}}{E_1} = \frac{38 \text{ kW}}{6500 \text{ kW}} = 0,58\%$$

Therefore, the total electrolysis nominal power is considerably reduced and the system optimized through the nested system of electrolysis units (5).

Figure 5:
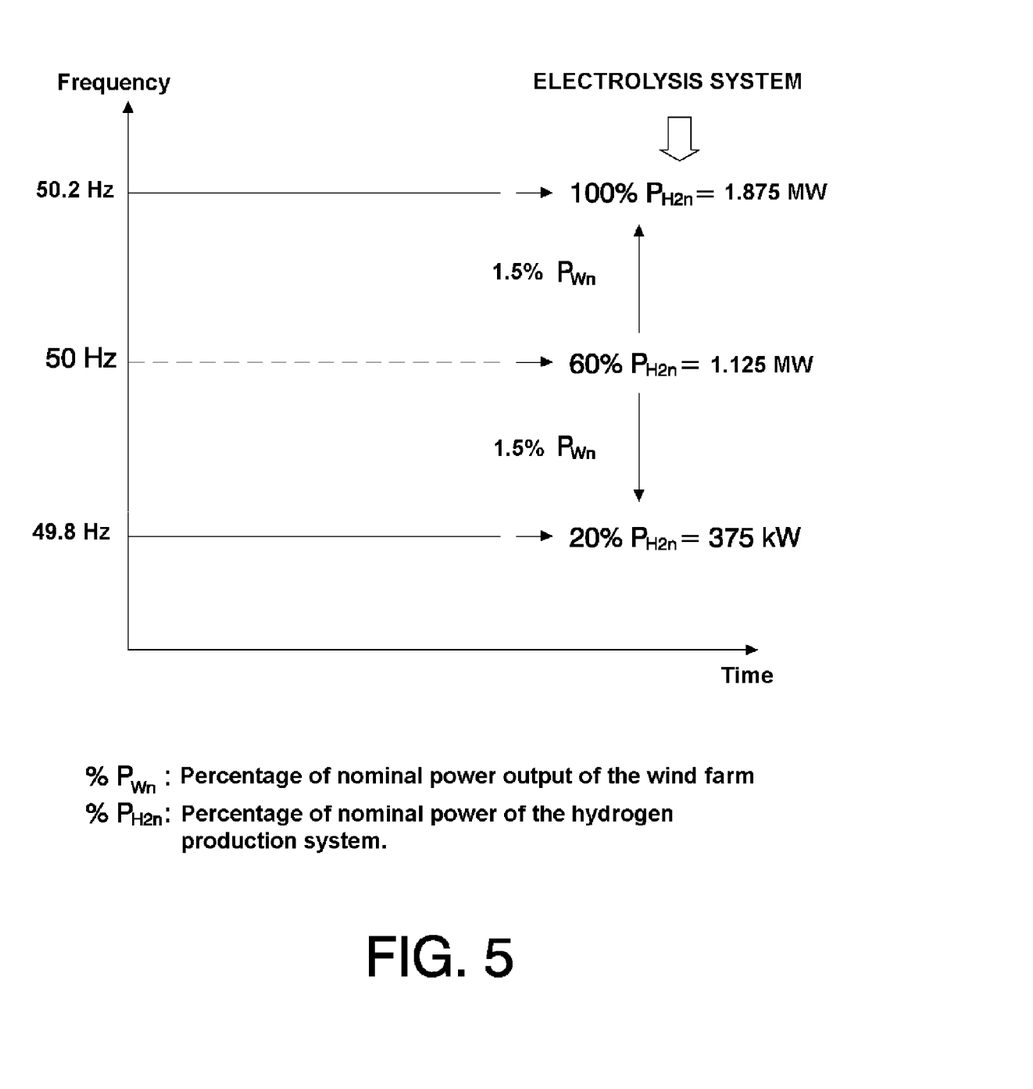
FIG. 5 shows a chart corresponding to the primary controlled operation of a hydrogen production system not divided into several units.
Figure 6:
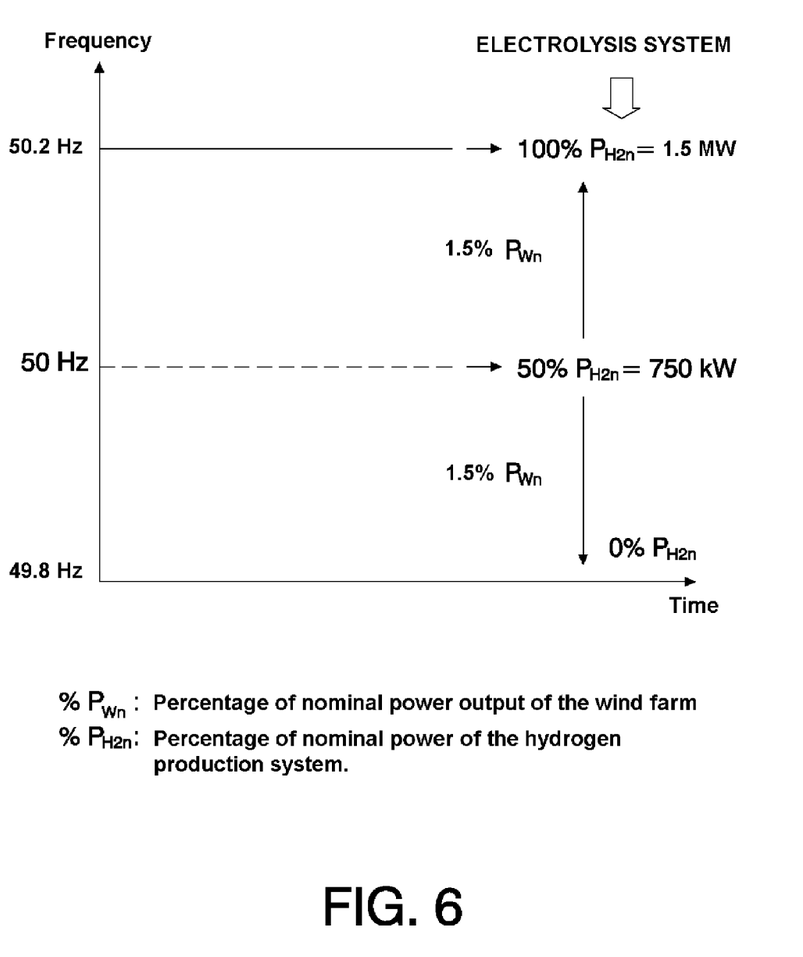
FIG. 6 shows a chart corresponding to the primary controlled operation of a hydrogen production system divided into several electrolysis units.

As can be observed in FIG. 5, assuming control bands of 1.5% of the wind farm's (2) nominal power ($P_{Wn}$), for both injection and withdrawal of power, and this nominal power $P_{Wn}$ equal to 50 MW, a hydrogen production system (4) that is formed by only one electrolysis unit or, as the case may be, by several units but operated jointly in such a manner that, in practice, they behave as a single unit, and which is based on technology with a characteristic dead band (DB) of 20%, would require a total electrolysis nominal power of 1.875 MW, wherein the operating range, based on the primary control needs, would be that shown in FIG. 5 for a control of between 49.8 Hz and 50.2 Hz On the contrary, as shown in FIG. 6, the application of the present invention to the hydrogen production system (4) with a division into three electrolysis units (5) of the same technology, as expounded in the preceding example, the total nominal power required would drop to approximately 1.5 MW (in this case the dead band of 0.58% obtained for this configuration would be considered negligible), representing a size reduction of 25%.

Figure 7:
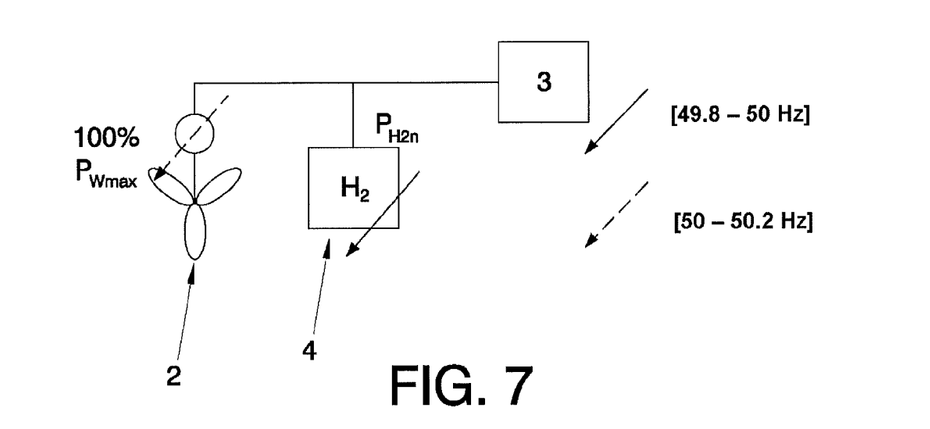
FIG. 7 shows a schematic view of a primary control service jointly provided by a hydrogen production system and a wind farm.

In accordance with another preferred embodiment shown in FIG. 7, the primary control service is provided jointly by the wind farm (2) and the hydrogen production system (4). In this case, the wind turbines (1) of the wind farm (2) and the hydrogen production system (4). In this case, the wind turbines (1) of the wind farm (2) are operated, so long as the primary control service is not required, at a power equal to the maximum available wind power ($P_{Wmax}$), calculated by the farm's supervision system. In turn, the hydrogen production system (4) is maintained at its nominal power ($P_{H2n}$). At this moment, the total power injected into the power grid (3) is the difference between the two power values $P_{Wmax}$ and $P_{H2n}$. When primary control of injection is required, i.e. power must be injected in the event of a reduction in grid (3) frequency, the hydrogen production system (4) modifies its operating point by reducing power consumption to below its nominal value, thereby releasing the power generated by the wind farm (2), which is injected into the grid (3). In this situation, the wind farm (2) continues operating at its maximum power ($P_{Wmax}$). On the contrary, when primary control of withdrawal is required and the power injected into the grid (3) must therefore be reduced, it is the wind farm (2) which reduces its power output, while the hydrogen production system (4) continues operating at its nominal power.

Figure 8:
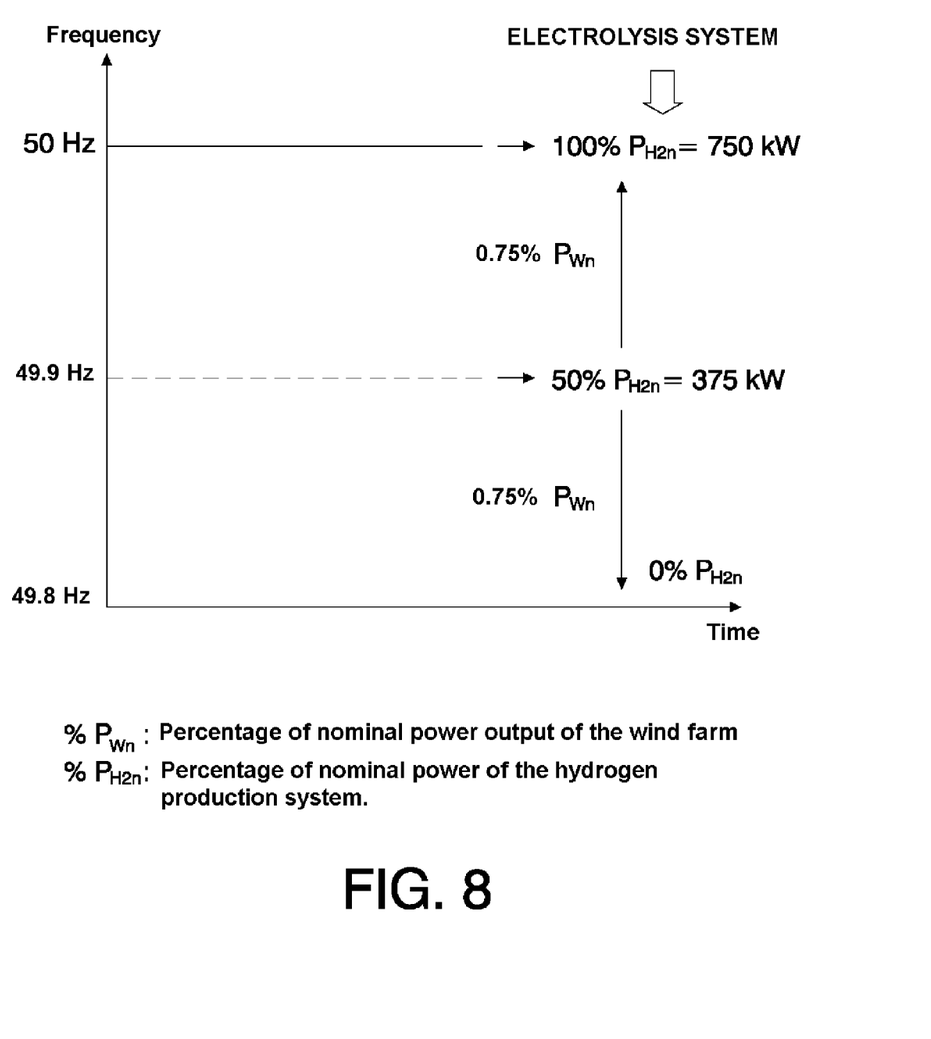
FIG. 8 shows a chart corresponding to the primary controlled operation of a hydrogen production system carried out jointly by a wind farm and said hydrogen production system, the latter having a nested configuration of several, independently operated electrolysis units.

Maintaining the control bands previously assumed by way of example, consisting of 1.5% of the nominal power of the wind farm (2) ($P_{Wn}$), both for injection and withdrawal, and the value used for this nominal power $P_{Wn}$ (50 MW), the hydrogen production system (4), having a nested configuration in accordance with that described herein and therefore with a negligible dead band, would require a total nominal power of 0.75 MW (1.5% of 50 MW), acting in the manner indicated in FIG. 8 for a control band ranging between 49.8 Hz and 50 Hz. Once again, we can observe the advantage of the proposed invention over a conventional electrolysis system formed by a single electrolysis unit or by several jointly operated units, which would require a nominal power of 0.9375 MW for a technology with a dead band of 20%.

Figure 9:
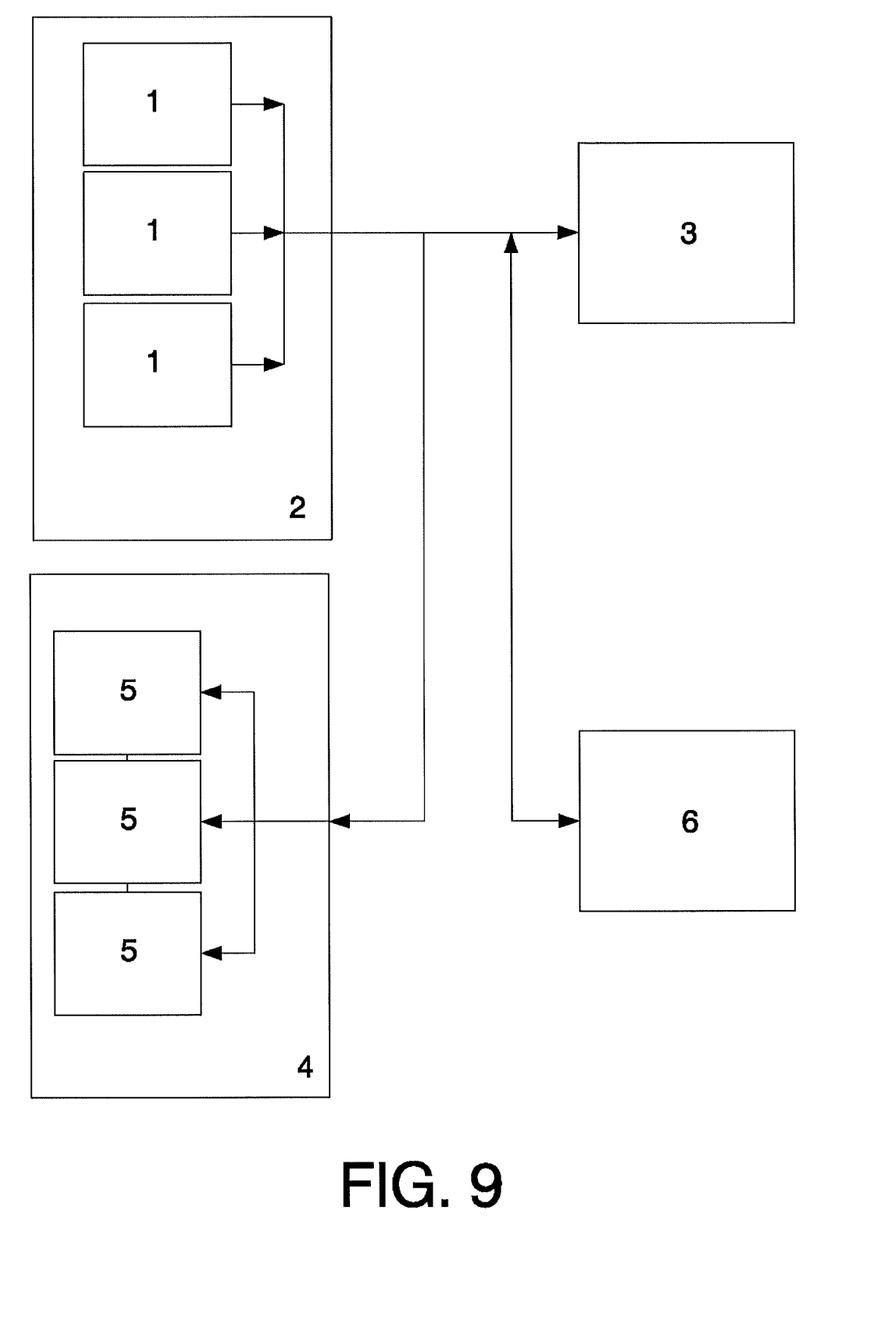
FIG. 9 shows a schematic view of another possible general installation which additionally incorporates a battery rack.

Finally, in another preferred embodiment of the present invention, represented in FIG. 9, a battery system (6) is also provided to back up the primary control service of part of the frequency bands. The battery system (6) is connected to the same point of connection as the rest of the elements (wind farm (2), hydrogen production system (4) and power grid (3)) and its consumption or energy generation is controlled by the global supervision system. The battery system (6) provides support both if primary control is provided only by the hydrogen production system (4) and if it is provided jointly by the wind farm (2) and the hydrogen production system (4).

Assuming the first case (primary control wherein the wind farm (2) does not intervene), consumption or battery charging (6) is carried out when control of withdrawal is required, i.e. when the power injected into the grid (3) must be reduced as a consequence of an increase in frequency thereof, and electricity generation or battery rundown (6) is carried out when control of injection is required, i.e. when power must be injected into the grid (3) in the event of a frequency drop.

Based on the frequency range, different embodiments are possible within the control bands in which the battery system (6) operates. Firstly, the battery system (6) may be used to control the extreme frequencies of the primary control range. In current power systems, grid (3) frequency oscillates around its nominal value within a range considerably lower than that established by the primary control limits. Given that electrolysis systems are expensive, the battery system (6) may be used to cover extreme frequencies and carry out primary control in frequencies close to the nominal frequency with the hydrogen production system (4), thereby reducing its size.

In another preferred embodiment, the battery system (6) may be used to control the frequency range around the nominal frequency, leaving the control of the frequencies external to said range to the hydrogen production system (4). This embodiment is advantageous when the speed of response of the electrolysis technology used is insufficient or inadequate for fulfilling the primary control response stipulated by the applicable regulation or grid (3) operator. When the battery system (6) covers the central frequency range, the speed of response falls basically on said system, while the operation of the hydrogen production system (4) may be programmed in advance as grid (3) frequency is observed to move away from the nominal value and approaches the extremes of the control band.

In another preferred embodiment, a fuel cell system may be included to carry out primary control of the injection band, i.e. when grid (3) frequency falls below the nominal frequency and more power must be injected into the grid (3). At this point, the fuel cell system is activated, generating electrical energy which is injected into the grid (3). In this embodiment, the hydrogen production system (4) carries out control of withdrawal, i.e. consuming power when the power injected into the grid (3) must be reduced due to frequency rises. Eventually, the hydrogen produced by the hydrogen production system (4) may be stored and used subsequently by the fuel cell system. The latter may also be replaced by a system formed by a hydrogen combustion engine and electric generator, as well as by a combination of both or any other equivalent system.

In another preferred embodiment, the assembly formed by the wind farm (2) (or aggregation of farms or, in general, renewable electricity generation systems) and the hydrogen production system (4), may be operated in such a manner that it is partially manageable, providing part of the power control service. In this case, the wind farm (2) is operated in such a manner as to generate the maximum available wind power ($P_{Wmax}$) at all times, while the hydrogen production system (4) remains inactive until power control services are required. At the moment in which the power withdrawal control service is required, i.e. when the power injected into the grid (3) must be reduced in the event of a rise in its frequency, the hydrogen production system (4), formed by the previously described nested configuration of electrolysis units (5), is operated in such a manner as to consume the power required for the output power of the assembly (wind farm (2) and hydrogen production system (4)) to be reduced to the value required by the control service.

Likewise, another embodiment is possible, along the same lines marked by the preceding embodiment, wherein the wind farm (2) continues to generate the maximum wind power available at a given time ($P_{Wmax}$) and the hydrogen production system (4) operates, under normal conditions, in such a manner as to consume the nominal power ($P_{H2n}$). At the moment in which the injected power control service is required, i.e. when the power injected into the grid (3) by the assembly in the event of a drop in frequency, the hydrogen production system (4) reduces hydrogen production, along with power consumption, in such a manner that the assembly increases the power injected into the grid (3) until reaching the value required by the control service. Once again, as in the preceding embodiment, the assembly formed by the wind farm (2) and the hydrogen production system (4) is partially manageable.

As already mentioned on several occasions, the present invention not only allows grid (3) connected primary control of a wind farm (2) through a nested system of electrolysis units (5), but is also applicable to those control services, such as secondary or tertiary, that require modification of the power injected by the wind farm (2) into the grid (3) based on power profiles dependent upon the control of active power in the power grid (3).

In another preferred embodiment, the power electronics installed in both renewable power stations and the hydrogen production system (4) is used to back up the control of reactive power exchanged with the grid (3) at the point of connection thereto, in the apparent power range not used by the active power generated by the stations or consumed by the hydrogen production system (4).

As we are already aware, power electronics equipment is designed and sized to support certain electrical current and voltage values. These determine the maximum apparent power of the equipment, which can be referred to as apparent nominal power. Apparent power is the result of the vector sum of the active and reactive power values in an electrical system. In this manner, when the active power that flows through the power electronics is not the maximum, as frequently occurs in the preferred embodiments described herein, the capacity to deliver reactive power up to the limit marked by the apparent power exists. At this point, power electronics is activated so that, in addition to delivering the active power required in accordance with the embodiment and grid operation requirements, it carries out the required reactive power control partially or fully depending on whether the maximum apparent power and maximum voltage and current values supported by the semiconductors are reached or not, respectively.

In conclusion, the present invention enhances power control capacity in wind farms (2) through the use of a hydrogen production system (4) formed by a nested configuration of electrolysis units (5) which allows reduction of the dead band of said hydrogen production system (4) to negligible levels. The different embodiments of the present invention allow the conversion of power stations based on non-manageable renewable resources into power stations with manageable power control.

The invention claimed is:

1. A hydrogen production system for controlling power in power stations based on renewable energy sources, comprising at least one level of two electrolysis units that are independently controlled comprising a larger electrolysis unit and a smaller electrolysis unit, the at least one level of electrolysis units being disposed in a descending nominal power configuration such that, for any level of electrolysis units, the nominal power of the smaller electrolysis unit is approximately equal to a dead band of the larger electrolysis unit, said dead band being the region in which the electrolysis unit cannot operate;
wherein the hydrogen production system is continuous throughout the operating range of the system thus reducing the dead band of said hydrogen production system to a negligible value, said value being lower than the dead band of a system with a single electrolysis unit and avoiding the loss or discharge of energy generated in a grid connected to renewable power stations.

2. The system of claim 1, wherein the power station based on renewable energy sources is comprised of one or more wind farms in co-ordination with each other and formed, in turn, by a group of wind turbines.

3. The system of claim 1, wherein the power station based on renewable energy sources is comprised of one or several photovoltaic power stations.

4. The system of claim 1, further comprising a battery system for helping the hydrogen production system to control power consumption.

5. The system of claim 1, further comprising a fuel cell system in charge of generating electrical energy and injecting it into the grid in the range of grid frequencies below a nominal frequency, while the hydrogen production system is in charge of consuming electrical energy in the range of grid frequencies above the nominal frequency.

6. The system of claim 5, further comprising a hydrogen storage system, in such a manner that the hydrogen produced by the hydrogen production system is subsequently consumed by the fuel cell system.

7. The system of claim 1, further comprising a system formed by a hydrogen combustion engine with an electric generator coupled thereto.

8. The system of claim 4, further comprising an energy storage system based on flywheels or condenser banks or a combination of these with the battery system.

9. The system of claim 1, wherein both the hydrogen production system and said power stations incorporate power electronics that regulate a reactive power generated or consumed at a point of connection to the grid.

10. A process for controlling power delivered to a grid for controlling grid frequency at its nominal value, with a hydrogen production system for controlling power in power stations based on renewable energy sources, the hydrogen production system comprising at least one level of two electrolysis units that are independently controlled comprising a larger electrolysis unit and a smaller electrolysis unit, the at least one level of electrolysis units being disposed in a descending nominal power configuration such that, for any level of electrolysis units, the nominal power of the smaller electrolysis unit is approximately equal to a dead band of the larger electrolysis unit, said dead band being the region in which the electrolysis unit cannot operate;
wherein the hydrogen production system is continuous throughout the operating range of the system thus reducing the dead band of said hydrogen production system to a negligible value, said value being lower than the dead band of a system with a single electrolysis unit and avoiding the loss or discharge of energy generated in a grid connected to renewable power stations, and
wherein grid frequency control is only carried out through the hydrogen production system.

11. The process of claim 10, wherein when primary control of injection is required, in which power must be injected into the grid, which occurs when the frequency drops below its reference value, the hydrogen production system reduces its power consumption.

12. The process of claim 10, wherein when primary control of withdrawal is required, in which when the power delivered to the grid must be reduced, which occurs when the frequency rises above its reference value, the hydrogen production system increases its power consumption.

13. The process of claim 10, wherein the power station based on renewable energy sources is comprised of one or more wind farms in co-ordination with each other and formed, in turn, by a group of wind turbines, being the grid frequency jointly controlled by the wind farm and the hydrogen production system.

14. The process of claim 13, wherein the wind turbines of the wind farm continue operating at the maximum power available at a given time and the electrolysis units operate at 50% of their operating range, while the primary control service is not required.

15. The process of claim 13, wherein the wind turbines of the wind farm continue operating at the maximum power available at a given time and the electrolysis units operate at 100% of their operating range, while the primary control service is not required.

16. The process of claim 13, wherein when primary control of injection is required, the hydrogen production system modifies its operating point, reducing the power consumed to below its nominal value, thereby releasing power from the wind farm which is injected into the grid, whereupon the wind farm continues operating at maximum power.

17. The process of claim 13, wherein when primary control of withdrawal is required, it is the wind farm which reduces its power output, while the hydrogen production system continues operating at its nominal power.

18. The process of claim 10, wherein the hydrogen production system is connected to a battery system which operates within a frequency range proximate to the nominal frequency of the hydrogen production system, while the hydrogen production system, with slower dynamics, operates at frequency values external to the operating range of the battery system, for the overall frequency control band established by primary control regulations.

19. The process of claim 10, wherein the hydrogen production system is connected to a battery system, the hydrogen production system operates within a frequency range proximate to the nominal frequency of the hydrogen production system, and the battery system operates at frequency values external to the operating range of the hydrogen production system, for the overall frequency control band established by primary control regulation.

20. The process of claim 10, wherein secondary and/or tertiary control services may also be provided.

21. A process for controlling reactive power exchange with the grid for power stations based on renewable energy sources, wherein reactive power is controlled by means of power electronics applied to both said stations and the hydrogen production system of claim 1.

22. The system of claim 5, further comprising a system formed by a hydrogen combustion engine with an electric generator coupled and the fuel cell system.

23. The system of claim 1, further comprising at least two levels of two electrolysis units independently controlled, wherein the smaller electrolysis unit of a first level is in turn divided into two electrolysis units for a second level.

* * * * *